United States Patent [19]

Oehmichen et al.

[11] Patent Number: 4,601,559
[45] Date of Patent: Jul. 22, 1986

[54] SLIDE PROJECTOR AND SLIDE TRAY

[76] Inventors: Eckhart Oehmichen, Hoelzleswiesen 18, Stuttgart 75; Alf K. Neustadt, Mohlstrasse 4, Stuttgart 1, both of Fed. Rep. of Germany

[21] Appl. No.: 573,388

[22] Filed: Jan. 24, 1984

[30] Foreign Application Priority Data

Jan. 24, 1983 [DE] Fed. Rep. of Germany ....... 3302181
Jan. 24, 1983 [DE] Fed. Rep. of Germany ....... 3302182

[51] Int. Cl.$^4$ .................................................. G03B 23/02
[52] U.S. Cl. ..................................... 353/111; 353/122; 353/120
[58] Field of Search ............... 353/111, 112, 115, 116, 353/103, 120, 122

[56] References Cited

U.S. PATENT DOCUMENTS

| | | | |
|---|---|---|---|
| 3,495,902 | 2/1970 | Michniewicz | 353/112 |
| 3,644,033 | 2/1972 | Frystak | 353/111 X |
| 4,354,745 | 10/1982 | Armstrong | 353/112 |

Primary Examiner—Harry N. Haroian
Attorney, Agent, or Firm—Thomas M. Marshall

[57] ABSTRACT

The slide projector (4) for single-slide, lap-dissolve or stereo projection, which works on the gravity feed principle, is designed for operation with linear slide trays (1, 2) divided into compartments. At the top, it has either two receptacles for slide-tray covers (2, 5) or one receptacle (4g) and one cover (4h) integral with the housing of the projector. When being placed on the projector, the slide tray is automatically unlocked, so that the housing of the tray becomes shiftable. Switching means ensure that the projector cannot operate until the slide tray is properly positioned. The projector also has a variable electronic light intensity control facility. It initiates no projection when a tray compartment is empty.

The slide tray (1, 2) is so designed that slides are loaded into the housing (1) of the tray from above in an upright and laterally correct image position; the housing (1) is then closed with the cover (2). During projection, the cover forms the bottom of the slide tray.

14 Claims, 5 Drawing Figures

SLIDE PROJECTOR AND SLIDE TRAY

The present invention relates to a slide projector for slide trays divided into compartments, and to the slide tray belonging thereto.

A slide projector of this kind which uses a circular slide tray is disclosed in U.S. Pat. No. 3,276,314.

DE-AS No. 1051027 discloses a slide projector which works on the gravity feed principle and uses a linear slide tray. In this known slide projector, after the projection, the slides are not returned to the tray but stacked below the place of projection. The tray used differs from the circular tray in that is is not divided into compartments, and that the the slides in the tray are shifted, not the tray itself. This projector is therefore, hardly comparable with the first-mentioned projector, on which the invention is based.

The object of the invention is to provide a slide projector working on the gravity feed principle and employing linear slide trays divided into compartments. In addition, a slide tray suitable for such a projector is to be provided.

The implementation of the novel slide projector is given in claim 1, and the novel slide tray in claim 10. Details are given in the respective subclaims.

The principal advantage of the slide projector is that it has very favourable dimensions if designed as a stereo projector or a lap-dissolve projector.

The desired preheating of the slides is achieved without any additional steps having to be taken. The control described permits very simple and foolproof operation. In addition, a new tray can already be placed on the projector while the last slide of the previous tray is still being projected.

German Utility Models 18 27 611 and 18 31 796 disclose a slide tray with sliding cover which bears resemblance to the slide tray in accordance with the invention but is designed to be used only in slide projectors in which the slides are moved to the viewing position by means of a pushing device moving through slits in the tray. Thus, this tray is not completely closed even with the cover slipped on, so that the slides may get dusty. In addition, the known tray has no latching device between the housing and the bottom which is automatically unlatched when the tray is placed on the projector.

The invention will now be explained in more detail with reference to the accompanying drawings, in which.

Figure 1:
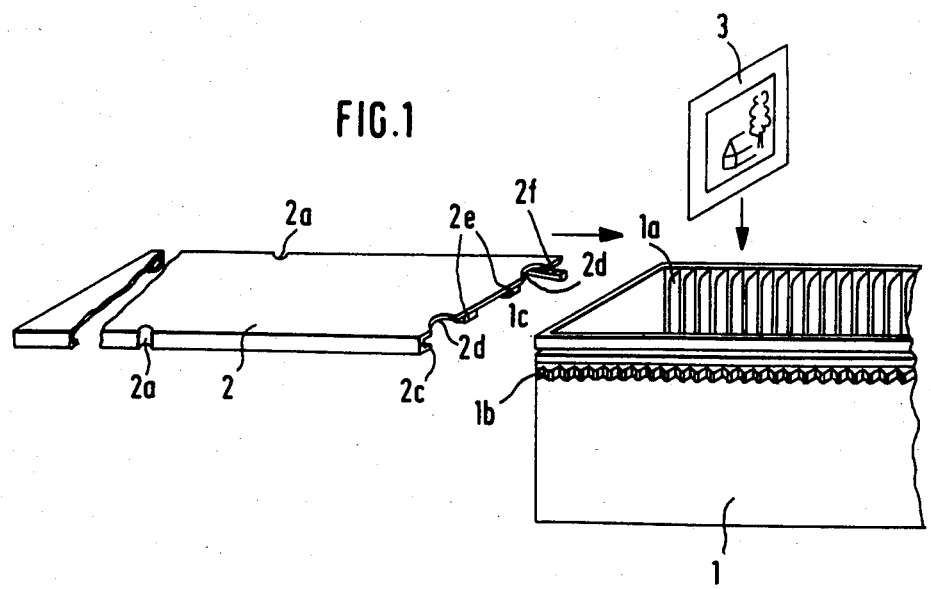
FIG. 1 shows a slide tray for the projector in the loading position.

The slide tray shown in FIG. 1, which is designed for the projector according to the invention, consists of a housing 1 and a cover 2. The housing 1 has teeth 1b, which serve as transporting means and are known per se. The fins of the housing are designated 1a.

The housing of the slide tray is shown in the loading position, as is indicated by a slide 3. It can be seen that the slide is inserted in an upright and laterally correct position. After slides have been loaded into the tray, the cover 2 is slipped on in the longitudinal direction (longitudinal guide consisting of groove 1c and edge 2c) until a detent 2f engages at the short side (not shown) of the housing, the rear edge 2g of the cover acting as a stop. In this manner, the slide tray is completely closed and securely locked in position for transportation. The detent 2f is provided with a pressure area (not shown) for unlatching. The cover 2 also has slide rails 2e for the slides which are beveled at the front, lock and guide depressions 2a, and recesses 2d.

Figure 2:
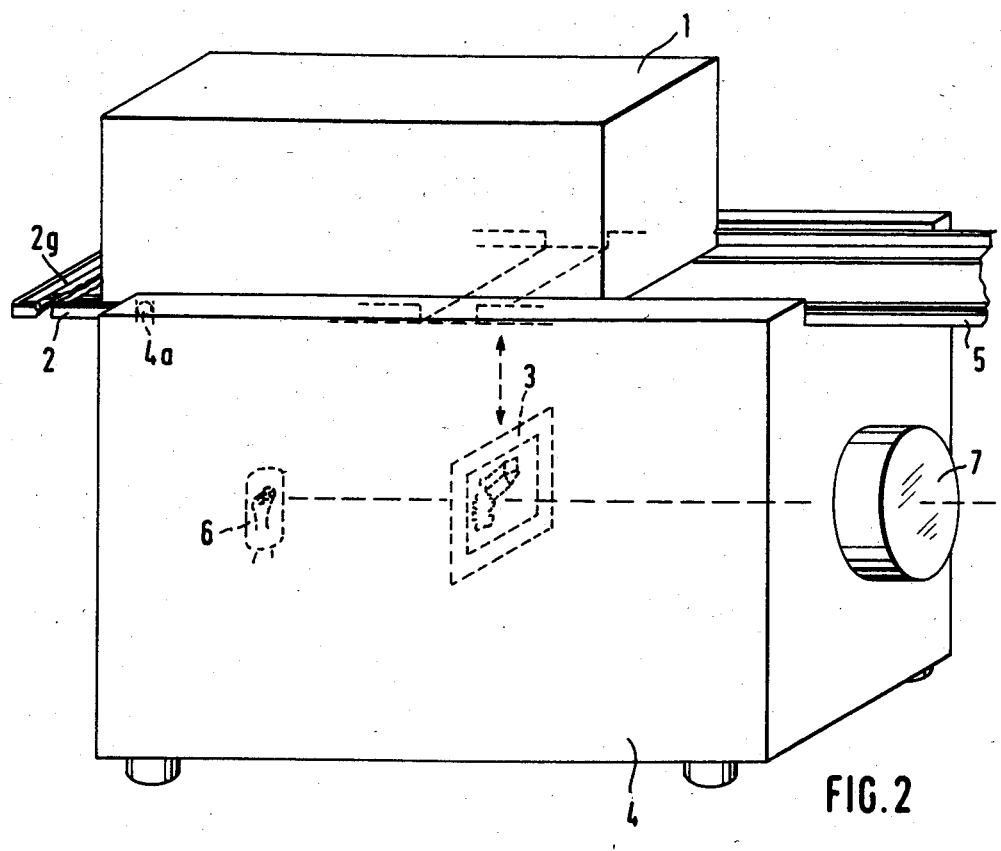
FIG. 2 shows the projector in the working position with a slide tray placed thereon.

FIG. 2 shows a projector 4 with a slide tray 1, 2 placed thereon. The slide tray to be inserted is turned 180 degrees about its longitudinal axis, so that the cover forms the bottom of the tray, the slides standing on the slide rails 2e. The cover of the slide tray is introduced at a slight angle into a receptacle 4g (FIG. 3), is pushed under a toe dog 4b, and is locked in position by the latter and by means of spring-operated balls 4a engaging the depressions 2a. The recesses 2d facilitate the introduction. At the same time, the housing 1 of the slide tray is unlocked by actuating the detent 2f with a pin 4c at the projector 4, so that it is movable relative to the bottom 2.

At the top of the projector 4 of FIG. 2, of which a lamp 6 and a lens 7 are outlined, there is a second cover 5, to which the housing 1 of the slide tray passes over during its movement, which is effected via the teeth 1b. A drive mechanism 13 (FIG. 3) controls the movement of the housing in such a way that switching to reverse takes place at the end of the forward movement. At the end of the reverse movement, the housing 1 of the slide tray is above the cover 2 again. It can now be removed together with the cover 2. During the removal, the detent 2f engages.

Figure 3:
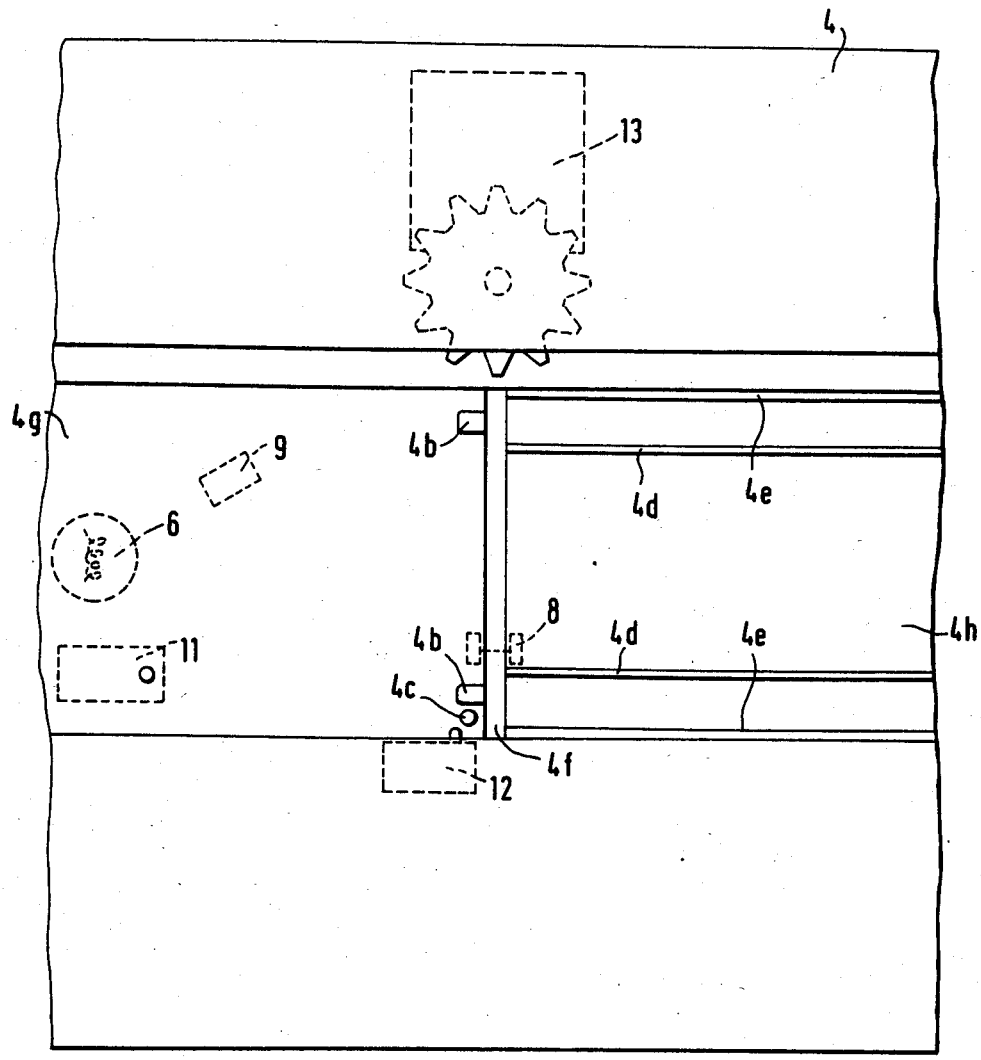
FIG. 3 is a top view of the central portion of the projector.

The second cover 5 is not necessary if formed as an integral part of the housing 4 of the projector, as indicated in FIG. 3. The integrated receptacle is designated 4h and has edges 4e for guiding the housing 1 of the slide tray in the longitudinal direction and slide rails 4d for the slides.

Between the two covers or between the inserted cover and the integral cover, which are in alignment, the vertical passageway 4f is located.

For the mechanical actuation of the projector, a drive for moving the housing of the slide tray in a forward or reverse direction and a slide lifter for moving the slides in the vertical direction are provided. The drive is a single-revolution drive consisting of a drive motor, a friction clutch, an electromagnetically operated pawl, and a subsequent gearing with drive gear. Whenever the drive is released, the housing of the slide tray will be moved by one compartment in the forward or reverse direction. Reversal of the direction of rotation is effected by reversing the polarity of the drive motor. The slide lifter (not shown) consists of a moving magnet having a lever mounted on its shaft.

A microswitch 11 in the receptacle 4g does not release the drive in the forward direction until a slide tray is properly positioned on the projector. The arrangement of FIG. 2 includes a second, corresponding microswitch which blocks the drive if no second cover is properly inserted. This prevents the slides from being moved from the tray introduced into 4g to the receptacle for the cover 5. The arrangement of these switches offers the advantage that the slide projector permits single-slide projection without the drive turning on.

Opposite the drive gear is a reflective optical sensor 12 which trips the drive in the forward direction if the housing of the slide tray is pushed a little forward after the introduction of the tray, so that the slide will drop from the "1" compartment of the tray into the projecting position without the forward push button having to be operated.

The reflective optical sensor 12 serves to sense not only whether the housing of the slide tray is in the initial position but also whether the housing has completely passed through. If the reflective optical sensor has ceased delivering a signal and the drive is operating in the forward direction, the drive will stop, reverse its direction of movement, and return the housing of the slide tray to the initial position, with the slide lifter being constantly in the working position. The drive in the reverse direction will be switched off when the front end of the housing of the slide tray has completely passed the reflective optical sensor. If the housing of the slide tray is provided with a bar code for each compartment, the reflective optical sensor can be used to advantage to read this bar code.

It is particularly advantageous to dispose in the vertical passageway 4f an infrared detector 8, which senses whether a slide has dropped. A negative message from this detector causes the drive to be indexed in steps until the first slide is automatically moved to the projecting position after the housing of the slide tray has been pushed forward. In this manner, empty compartments are skipped, so to speak.

Instead of a mechanical shutter, the slide projector is provided with control means for the projector lamp which do not turn on the lamp until a slide is dropping. Depression of the forward push button after projection first turns off the lamp and then releases the drive for a slide change if the brightness has decreased below a predetermined value which is sensed by means of a phototransistor 9.

To be able to vary the fade-out and fade-in, the brightness control rate is adjustable by means of an adjustable timer. The control element for this purpose is advantageously located in the remote control unit. Ideal control has been achieved if the viewer perceives a linear rise in brightness. An approximation of this ideal characteristic can be achieved simply by not increasing the intensity of the lamp from the voltage value 0 but starting this intensity increase at a predetermined voltage value when the slide is dropping and interrupts the light beam of the infrared detector 8.

To prevent any damage to the slides and the drive, a further timing circuit turns off the drive if the next dwell position of the housing of the slide tray has not been reached after a period of, e.g., 1 sec.

The projector has been described in connection with monoprojection. Because of the high indexing and control accuracy, the projector can be used to special advantage as a stereo projector.

The cover of the tray is advantageously designed so that it cannot be slipped on in the wrong manner, e.g., by being provided with different longitudinal guides on both sides.

If the slide tray is to be used for lap-dissolve projectors, the housing will be provided with a longitudinal partition, and the projector will be changed correspondingly (second slide lifter, partition in the vertical passageway, and changed sequence control).

Figure 4:
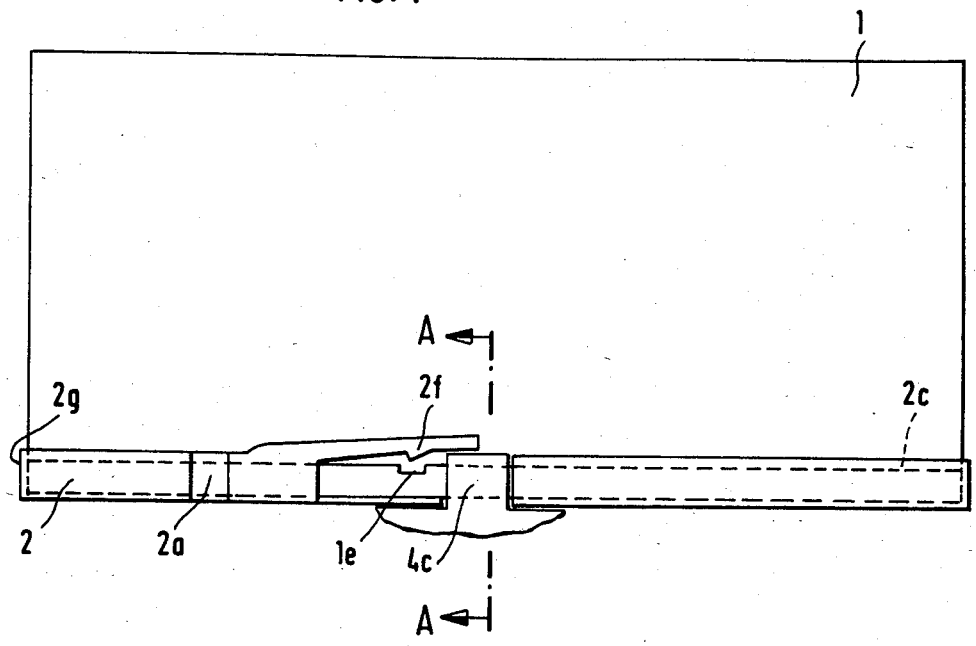
FIGS. 4 and 5 show details of the cover latch.
Figure 5:
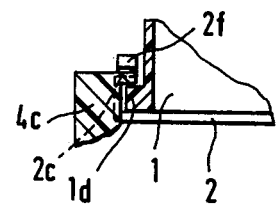

FIGS. 4 and 5 show details of a latch between the cover 2 and the housing 1, and of the member 4c at the projector, which cooperates with this latch. The latch and the arrangement of the parts slightly differ from the latch described in connection with FIGS. 1 to 3.

FIG. 4 is a rear view of the slide tray in the inserted condition of FIG. 2 but immediately after the tray has been placed on the projector, i.e., the housing has not yet been manually pushed forward to initiate the projection. FIG. 5 is a section taken along the line A—A of FIG. 4. For guiding the cover in the longitudinal direction, the housing does not have a groove 1c but a rectangular shoulder 1d. The edge 2c and the side surface of the cover are interrupted approximately in the middle, and the rectangular shoulder of the housing is interrupted at the corresponding point. In the area of the interruption, the detent 2f is provided at a resilient arm.

It can be seen that the arm is urged upwards by a profiled member 4c attached to the projector, so that the detent 2f is no longer in engagement with a depression 1e in the rectangular shoulder 1d of the housing. In the non-inserted condition, the detent is in engagement, so that the cover 2 is secured in position. The opening for the member 4c is so large that the end of the arm can also be pressed upwards by a finger.

The sectional view of FIG. 5 shows that the shape of the member 4c is such that its nose lies above the rectangular shoulder 1d of the housing. This ensures that the slide tray can only be removed in the end position. For longitudinal guidance on the other side of the slide tray, a like projection 4c may be provided. The housing and the cover of the tray must then be interrupted as well. A second latch is not necessary.

We claim:

1. A slide projector adapted for receiving linearly extending slide trays, each said tray having a cover portion and a housing portion divided into compartments operating on the gravity feed principle, including: a drive for said tray housing portion; a top portion having a first receptacle for the cover portion of said tray having a toe dog, a locking means, and an unlatching part forming an operative connection for unlatching the housing of said tray during insertion of the tray, said first receptacle being provided, at one end thereof, with a vertical passageway and, behind said passageway and in alignment with said cover portion of said tray when inserted therein a cover element integral with the housing of the projector; and each of said receptacles containing a switching means which releases the drive for the housing portion of tray only if both covers have locked into operating position.

2. A slide projector as claimed in claim 1, wherein the drive is a single-revolution drive followed by a gearing.

3. A slide projector as claimed in claim 1 or claim 2, wherein said drive is so controlled by said switching means as to automatically bring the slide in the first one of said compartments to the projecting position after the housing of the tray has been pushed forward to a predetermined initial position.

4. A slide projector as claimed in claim 3, having forward movement controlling push button means and wherein said drive is so controlled via an additional switching means in the said vertical passageway that the first slide is brought to the projecting position automatically, and the respective next slide is brought to the projecting position by a single depression of said forward control push button means.

5. A slide projector as claimed in claim 4, wherein depression of said forward push button means first actuates a darkness-brightness control means for lamp means in said projector to a decreased value and then, when a predetermined brightness value is sensed by a photodetector means is reached, releases said drive means, and then the intensity of said lamp is increased again as the next slide is dropping.

6. A slide projector as claimed in claim 5, wherein said brightness control is adjustable.

7. A slide projector as claimed in claim 6, wherein said darkness-brightness control means starts at a predetermined voltage value after the slide has dropped.

8. A slide projector as claimed in claim 3, wherein, after reaching its end position, the housing portion of said slide tray is automatically returned to the initial position.

9. A slide projector as claimed in claim 2, wherein said drive means is further provided with timing means to turn off said drive means automatically if the next projecting position has not been reached within a predetermined time.

10. A slide tray divided into compartments for a projector as claimed in any one of claims 1, and 2 to 9, consisting of a rectangular-parallelepiped-shaped housing having teeth formed thereon and a removable cover, said housing being open only on one side which is at the top when said tray is in the loading position and at the bottom when said tray is in the working position, and wherein near said open side, said housing has a longitudinal guide means for said cover, said cover being adapted to fit said longitudinal guide means in said projector housing means, and where detent means for locking the cover in the completely inserted position are provided, and said cover is provided with means forming an operative connection for locking said tray in working position and having slide rails for the slides.

11. A straight slide tray as claimed in claim 10, wherein different longitudinal guide means are provided on two sides.

12. A straight slide tray as claimed in claim 10, wherein said cover has a recess means at at least one side.

13. A straight slide tray as claimed in claim 10, wherein said cover portion has a stop means at the short side opposite said detent.

14. A slide projector adapted for receiving linearly extending slide trays, each said tray having a cover portion and a housing portion divided into compartments operating on the gravity feed principle, including: a drive for said tray housing portion; a top portion having a first receptacle for the cover portion of said tray having a toe dog, a locking means, and an unlatching part forming an operative connection for unlatching the housing of said tray during insertion of the tray, said first receptacle being provided, at one end thereof, with a vertical passageway and, behind said passageway and in alignment with said cover portion of said tray when inserted therein, a second receptacle for a separate cover; and each of said receptacles containing a switching means which releases the drive for the housing portion of tray only if both covers have locked into operating position.

* * * * *